(12) United States Patent  (10) Patent No.: US 8,639,826 B2
Slothouber et al.  (45) Date of Patent: Jan. 28, 2014

(54) PROVIDING PERSONALIZED RESOURCES ON-DEMAND OVER A BROADBAND NETWORK TO CONSUMER DEVICE APPLICATIONS

(75) Inventors: Louis P. Slothouber, Leesburg, VA (US); Jeffrey W. Johnston, Charlottesville, VA (US)

(73) Assignee: Fourthwall Media, Inc., Sterling, VA (US)

( * ) Notice: Subject to any disclaimer, the term of this patent is extended or adjusted under 35 U.S.C. 154(b) by 10 days.

(21) Appl. No.: 12/116,912

(22) Filed: May 7, 2008

(65) Prior Publication Data

US 2008/0281974 A1  Nov. 13, 2008

Related U.S. Application Data

(60) Provisional application No. 60/916,448, filed on May 7, 2007.

(51) Int. Cl.
*G06F 15/16* (2006.01)
*G06F 3/00* (2006.01)

(52) U.S. Cl.
USPC ............ 709/229; 715/703; 715/714; 715/745

(58) Field of Classification Search
USPC .......................................................... 709/229
See application file for complete search history.

(56) References Cited

U.S. PATENT DOCUMENTS 5,623,406 A    4/1997  Ichbiah
5,848,396 A *  12/1998 Gerace ......................... 705/7.33
5,948,061 A    9/1999  Merriman et al.
6,029,195 A *  2/2000  Herz .............................. 725/116
6,240,555 B1 * 5/2001  Shoff et al. .................... 725/110

(Continued)

FOREIGN PATENT DOCUMENTS

JP    8-180044      7/1996
JP    2003-015807   1/2003

(Continued)

OTHER PUBLICATIONS

Shimizu, et al.; "Nikkei Personal Computer"; Nikkei BP, vol. 525, pp. 165-168; Mar. 12, 2007.

(Continued)

*Primary Examiner* — Ario Etienne
*Assistant Examiner* — Blake Rubin
(74) *Attorney, Agent, or Firm* — Hunton & Williams LLP

(57) ABSTRACT

A method and system for providing personalized information to applications executing on consumer devices by: building a consumer preferences profile on a consumer device using predefined associations between consumer preference attributes and application events (including user input); summarizing the consumer preferences profile into a profile summary when applications require a new personalized data resource; requesting a personalized data resource from a centralized database of data resources over the broadband network by including application context information along with the profile summary in the request; analyzing data resource groups in the centralized database to find a candidate set of data resources according to resource rules in the resource groups; selecting a personalized data resource from the candidate set of data resources that matches the profile summary and context information; and delivering the selected personalized data resource to the requesting application over the broadband network. Personalized data resources may include resource selection information, graphic images, text content, formatting information, video clip data, click-to-call data, and scripts and procedures.

36 Claims, 12 Drawing Sheets

(56) References Cited

U.S. PATENT DOCUMENTS

| | | | |
|---|---|---|---|
| 6,266,649 B1 | 7/2001 | Linden et al. | |
| 6,728,679 B1 * | 4/2004 | Strubbe et al. | 704/270.1 |
| 6,771,290 B1 * | 8/2004 | Hoyle | 715/745 |
| 6,826,413 B1 | 11/2004 | Nakatsuchi et al. | |
| 6,850,252 B1 * | 2/2005 | Hoffberg | 715/716 |
| 7,003,792 B1 | 2/2006 | Yuen | |
| 7,111,243 B1 | 9/2006 | Ballard et al. | |
| 7,191,211 B2 | 3/2007 | Tuli | |
| 2002/0010757 A1 * | 1/2002 | Granik et al. | 709/218 |
| 2002/0052782 A1 * | 5/2002 | Landesmann | 705/14 |
| 2002/0075320 A1 * | 6/2002 | Kurapati | 345/811 |
| 2002/0147638 A1 * | 10/2002 | Banerjee et al. | 705/14 |
| 2003/0004961 A1 | 1/2003 | Slothouber et al. | |
| 2003/0018527 A1 * | 1/2003 | Filepp et al. | 705/14 |
| 2003/0028451 A1 * | 2/2003 | Ananian | 705/27 |
| 2003/0028889 A1 * | 2/2003 | McCoskey et al. | 725/91 |
| 2003/0120748 A1 * | 6/2003 | Begeja et al. | 709/217 |
| 2003/0135484 A1 * | 7/2003 | Gesek | 707/1 |
| 2003/0149975 A1 * | 8/2003 | Eldering et al. | 725/34 |
| 2003/0182567 A1 * | 9/2003 | Barton et al. | 713/193 |
| 2003/0229900 A1 * | 12/2003 | Reisman | 725/87 |
| 2004/0158503 A1 * | 8/2004 | Gross | 705/26 |
| 2004/0168121 A1 * | 8/2004 | Matz | 715/513 |
| 2004/0267816 A1 | 12/2004 | Russek et al. | |
| 2005/0132295 A1 | 6/2005 | Noll et al. | |
| 2005/0222989 A1 | 10/2005 | Haveliwala et al. | |
| 2006/0015904 A1 * | 1/2006 | Marcus | 725/46 |
| 2006/0020508 A1 | 1/2006 | Gorti et al. | |
| 2006/0041472 A1 * | 2/2006 | Lukose et al. | 705/14 |
| 2006/0047498 A1 | 3/2006 | Fux et al. | |
| 2006/0168664 A1 * | 7/2006 | Frank et al. | 726/27 |
| 2006/0195548 A1 * | 8/2006 | Hunter et al. | 709/217 |
| 2007/0004384 A1 | 1/2007 | Anupam | |
| 2007/0038516 A1 * | 2/2007 | Apple et al. | 705/14 |
| 2007/0078849 A1 | 4/2007 | Slothouber | |
| 2007/0088801 A1 * | 4/2007 | Levkovitz et al. | 709/217 |
| 2007/0244750 A1 * | 10/2007 | Grannan et al. | 705/14 |
| 2008/0021699 A1 | 1/2008 | Verma et al. | |
| 2008/0189253 A1 * | 8/2008 | Oliver et al. | 707/3 |
| 2008/0306782 A1 * | 12/2008 | Ephrati | 705/7 |

FOREIGN PATENT DOCUMENTS

| | | |
|---|---|---|
| JP | 2005-190389 | 7/2005 |
| JP | 2006-067620 | 3/2006 |
| JP | 2007-108971 | 4/2007 |

OTHER PUBLICATIONS

Japanese Office Action from Japanese Application No. 2010-507436, dated Nov. 1, 2012.

* cited by examiner

```
GET /resource_selector.cgi HTTP/0.9\r\n
DATE-TIME: 2007-05-18:15:42:54 \r\n
LOCATION-ZIPCODE: 20176 \r\n
CONTEXT-APPLICATION: YELLOW-PAGES \r\n
CONTEXT-APP-INTERNAL: search-term:ATTORNEY \r\n
CONTEXT-CHANNEL: CNN \r\n
PROFILE-SUMMARY: 01FA78D96B177CFF02019 \r\n
\r\n
```

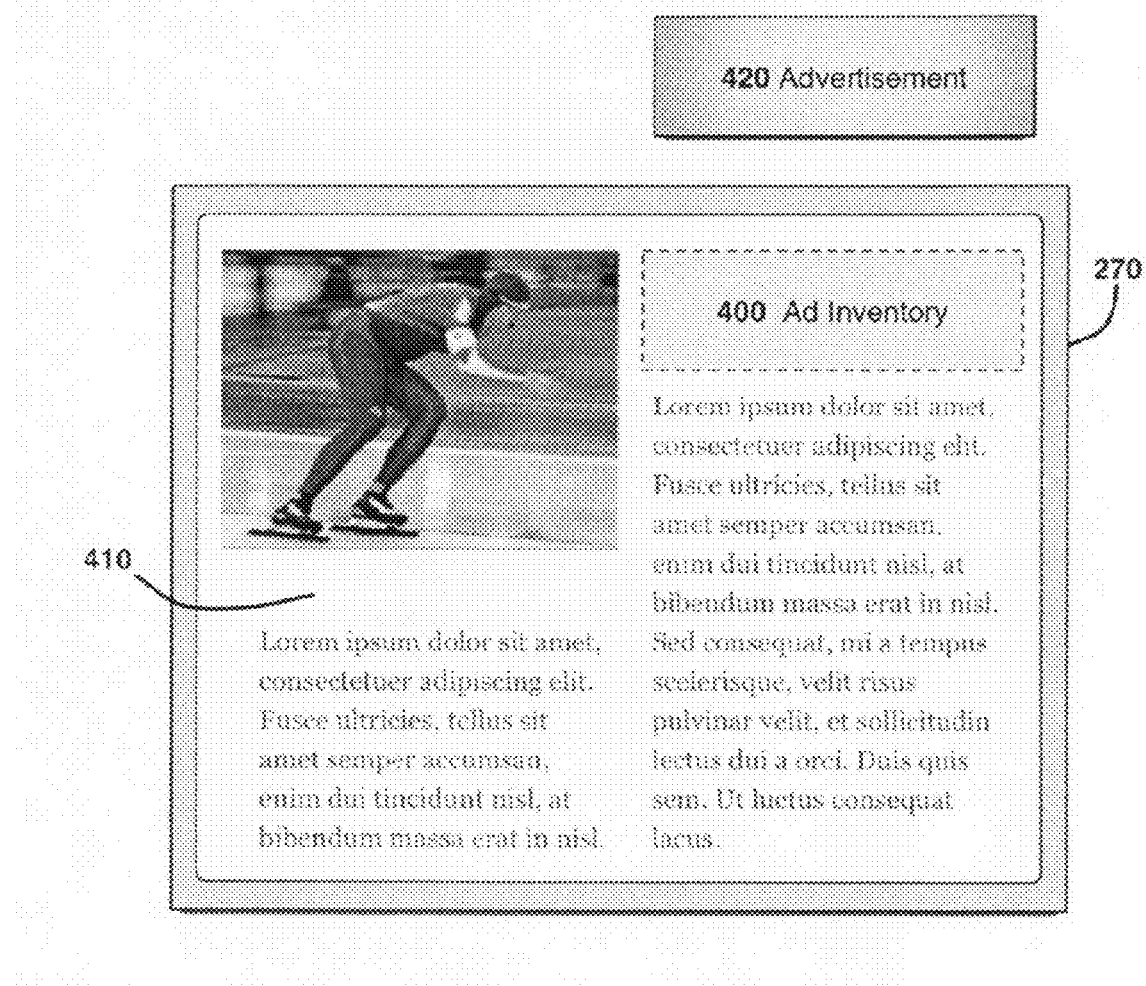

PROVIDING PERSONALIZED RESOURCES ON-DEMAND OVER A BROADBAND NETWORK TO CONSUMER DEVICE APPLICATIONS

REFERENCE TO RELATED APPLICATIONS

The present application claims benefit of priority from U.S. Provisional App. No. 60/916,448, filed May 7, 2007, entitled "RIOT," herein incorporated by reference in its entirety. The present disclosure is related to the following U.S. patent applications, which are incorporated by reference: U.S. application Ser. No. 10/173,565, filed Jun. 18, 2002, entitled "Apparatus for and method of executing customized interactive computing services in a broadband network environment;" and U.S. application Ser. No. 11/465,967, filed Aug. 21, 2006, entitled "System and method for recommending items of interest to a user."

FIELD OF THE INVENTION

The present disclosure relates generally to providing personalized resources to applications executing on consumer devices.

BACKGROUND OF THE INVENTION

In broadband networks where a wide variety of applications (e.g., games, news, communications, and commerce) execute on consumer devices, there is often a need to acquire resources personalized for the user that are not resident on the device. Such devices and networks include set-top boxes and digital TVs connected to cable, satellite, telephone, fiber, and Internet Protocol-based broadcast networks; cell phones and PDAs connected over a mobile phone network; and personal computers connected over the Internet. Personalized resources may include information used in customized Internet or Interactive TV ("iTV") portals like weather forecasts, stock quotes, and news related to favorite sports, teams, and players; recommendations of items of interest (e.g., movies, music, products, and services); targeted advertisements; and advice tailored to a user based on his or her technical capacity and past history as may be utilized in advanced computer help systems.

There is a need for a system and method that provides personalized resources to a user of a consumer device which may provide one or more of the following: (a) find resources that best fit the consumer or user, (b) protect user privacy, (c) identify resources despite there being a large number of potential resources, (d) function on devices having limited computational and storage capacities, (e) preserve bandwidth on broadband networks where it is limited and/or asymmetrical (i.e., up-channel capacity different from down-channel), (f) support user models or profiles consisting of a large number of attributes, and (g) accommodate a variety of rules applicable to determining what resources are provided (e.g., user profiles, application context information, and business rules).

SUMMARY OF THE INVENTION

Certain embodiments according to the present disclosure address one or more of the aforementioned problems. For example, certain embodiments may address one or more of the aforementioned problems by providing a method and system for providing personalized data resources over a broadband network to applications executing on consumer devices by: building a consumer preferences profile on a consumer device using predefined associations between consumer preference attributes and application events, which may include user input; summarizing the consumer preferences profile into a profile summary when applications require a new personalized data resource; requesting a personalized data resource from a centralized database of data resources over the broadband network by including application context information along with the profile summary in the request; analyzing data resource groups in the centralized database to find a candidate set of data resources according to resource rules in the resource groups; selecting a personalized data resource from the candidate set of data resources that may match the profile summary and context information; and delivering the selected personalized data resource to the requesting application over the broadband network. Personalized data resources may include, but are not limited to, resource selection information, graphic images, text content, formatting information, video clip data, click-to-call data, and scripts or procedures.

Consumer devices which may be appropriate to this invention include but are not limited to digital televisions, digital television set-top boxes, personal digital assistants ("PDAs"), mobile phones, and personal computers. Appropriate broadband networks may include but are not limited to digital cable TV networks, digital satellite TV broadcast networks, mobile phone networks, and the Internet. Personalized data resources may include but are not limited to targeted advertisements, recommendations for products and services, and personalized technical advice in a computer help system. Applications may include, but are not limited to, applications for accessing news and other information, receiving weather forecasts, playing fantasy sports, participating in on-line auctions, accessing yellow pages information, summarizing sporting event results, participating in votes or polls, searching the Internet, engaging in email or chat functionality, and presenting television programs, movies, other video content, and/or music tracks. In embodiments of the invention, consumer preference attributes may reflect the demographics, geography, psychology, behaviors, and interests of consumers, including interests in specific products and services. A consumer preference profile may be a compact structure that maintains the level of evidence of each attribute in a logically consistent manner by appropriately integrating the evidence of attributes associated with each application that is run and content consumed. Application context information may include a set of attributes representing applications most recently run and content most recently consumed. The examples above are not limiting to the scope of the disclosure.

The format of the consumer preference profile and application context information may take a number of different forms, and many different statistical methods may be used to integrate new information into the profile.

BRIEF DESCRIPTION OF THE DRAWINGS

In order to facilitate a fuller understanding of the invention, reference is now made to the accompanying drawings, in which like elements are referenced with like numerals. These drawings should not be construed as limiting the present disclosure, but are intended to be exemplary only.

FIG. 8 is a diagram depicting exemplary contents of an HTTP Resource Request in accordance with an embodiment of the invention.

FIG. 12 is a diagram depicting content on a Display Device preparing to integrate an Advertisement in accordance with an embodiment of the invention.

DETAILED DESCRIPTION OF EXEMPLARY EMBODIMENTS

The following description is intended to convey an understanding of the invention by providing a number of specific embodiments and details involving various applications of the invention. It is understood, however, that the invention is not limited to these embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
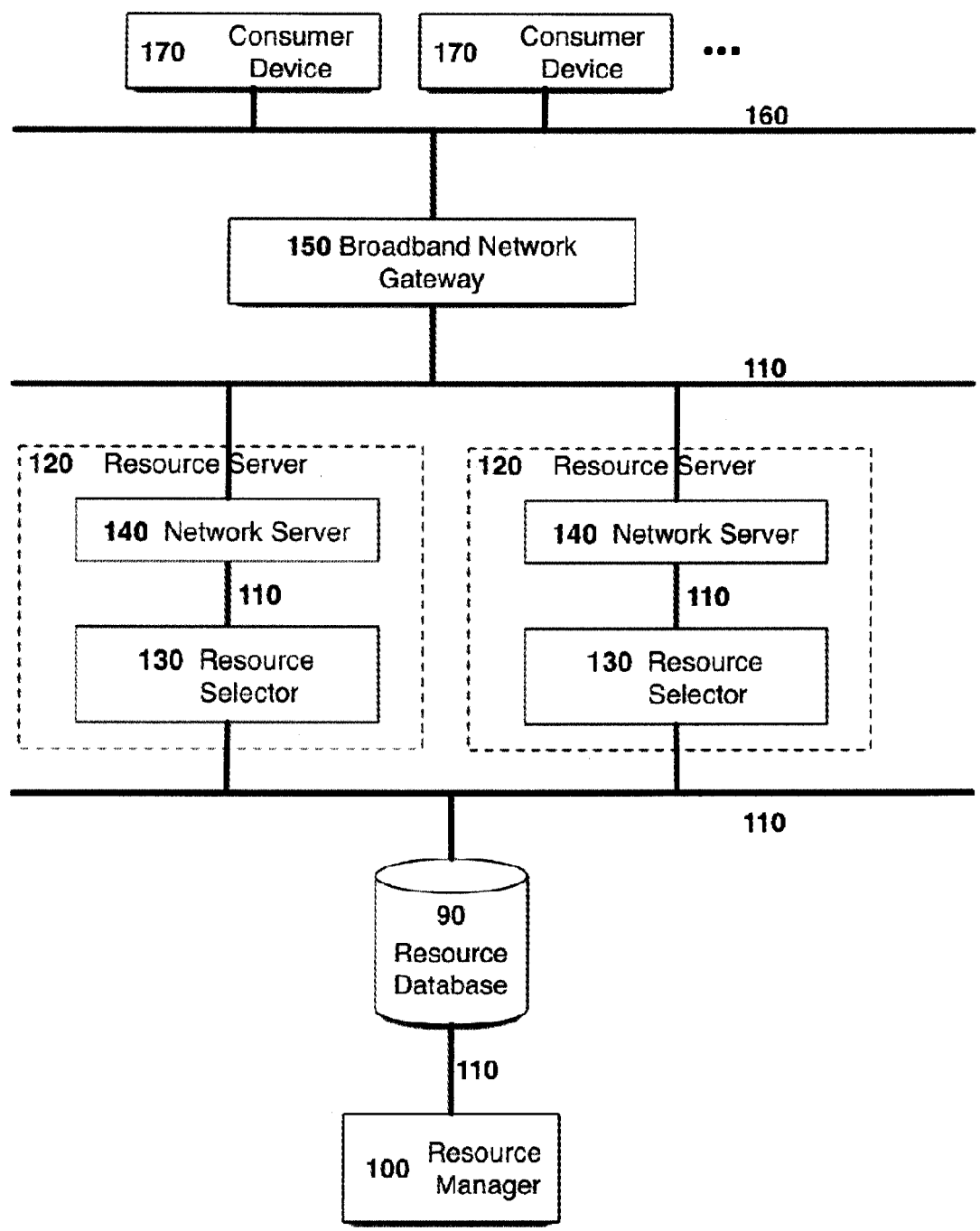
FIG. 1 is a diagram depicting a system in accordance with an embodiment of the invention.

Referring now to FIG. 1, there is provided a diagram depicting a system in accordance with an embodiment of the invention. The system may consist of a plurality of Consumer Devices 170 connected to a Broadband Network 160. The Broadband Network 160 may be connected to one or more Resource Servers 120 through a Broadband Network Gateway 150 via a Computer Network 110. The Resource Servers 120 may be connected to a Resource Database 90 which may be further connected to a Resource Manager 100. Connections may be made via one or more Computer Network(s) 110.

The Broadband Network 160 may be a physical or wireless interconnection that may carry data, including but not limited to Internet Protocol ("IP") data, between the Broadband Network Gateway 150 and any number of Consumer Devices 170. The Broadband Network 160 may be, for example, a hybrid fiber and coax ("HFC") network used to carry digital television signals between a digital television headend (i.e., the gateway) and consumer televisions or set-top boxes ("STBs") (i.e., the Consumer Device 170). In this embodiment, the HFC network may also be capable of carrying data via IP between Consumer Devices 170 and other devices connected via a Computer Network 110 to the headend. The Broadband Network 160 may be, for example, a mobile phone network and Consumer Devices 170 may be mobile phones or PDAs. In another embodiment, the Broadband Network 160 may provide wired and wireless connections to the Internet, and Consumer Devices 170 may be personal computers.

Computer Networks 110 depicted in FIG. 1 may represent physical or wireless interconnections between two or more computers or computing devices capable of carrying data. Such networks may take many forms, including but not limited to: on-chip interconnections between the components of a computer chip, wires between components in a computer, point-to-point network cables or other connections (e.g., infrared), local area Ethernet networks ("LANs") (e.g., CAT-5 cabling, 802.11 wireless, BlueTooth wireless), wide area networks ("WANs"), and the Internet. The Broadband Network Gateway 150 is a device that may connect two distinct networks, in this case the Broadband Network 160 to the Computer Network 110, and may perform transformations on the data necessary to communicate data from one network to the other. The Broadband Network Gateway 150 may be a digital cable television headend connecting a Computer Network 110 implemented via Ethernet (e.g., 10 Mbits/s-10 Gbit/s) to a digital television broadcast network (e.g., HFC).

Figure 4:
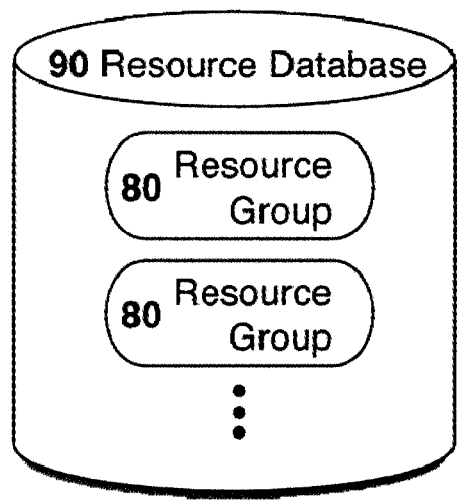
FIG. 4 is a diagram depicting components of a Resource Database in accordance with an embodiment of the invention.
Figure 5:
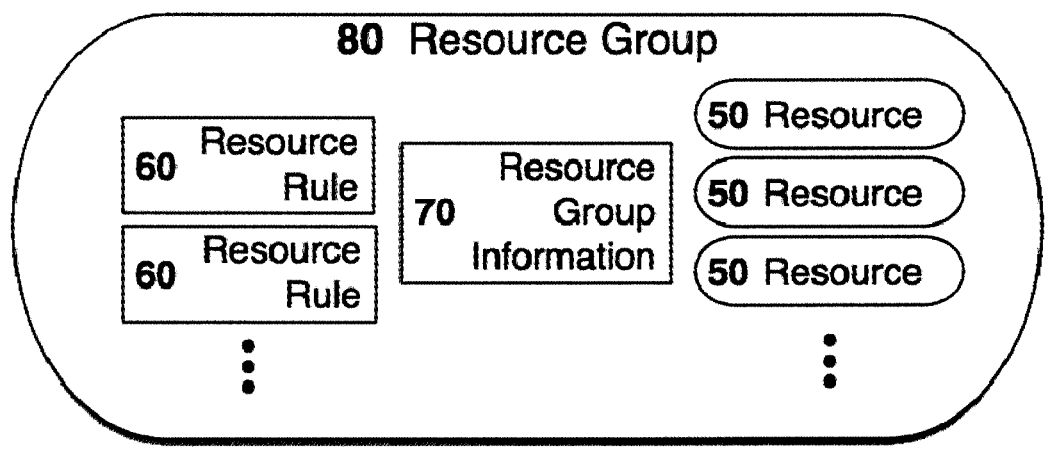
FIG. 5 is a diagram depicting components of a Resource Group in accordance with an embodiment of the invention.

The Resource Database 90 may contain a collection of one or more Resource Groups 80 as depicted in FIG. 4. The Resource Database 90 may provide conventional database mechanisms known to those skilled in the art for efficiently storing, retrieving, and operating on Resource Groups 80 and the Resources 50 contained therein (shown in FIG. 5). Resource Groups 80 may embody advertising campaigns that may define the content of advertisements and when and where advertisements should appear. A Resource Group 80, depicted in FIG. 5, may be a collection of Resources 50, Resource Rules 60, and Resource Group Information 70. Resource Group Information 70 may be a collection of binary or textual data that may describe or pertain to a given Resource Group 80, but may not be utilized by an embodiment of the method of the invention. For example, the pricing of advertising or the contact information of an advertiser may be considered Resource Group Information 70. Resource Rules 60 may be any text or binary data used to automate the selection of an appropriate Resource 50 for a given consumer independently from consumer-specific personalization information. A given Resource Rule 60 may apply to one or more Resources 50. For example, for advertising within interactive television applications, Resource 50 may embody the components of an advertisement and a Resource Rule 60 may specify the maximum number of times that a specific advertisement (Resource 50) may be selected by a Resource Selector 130 (described below) over a given time period. Another exemplary Resource Rule 60 in this advertising embodiment may specify that a specific advertisement (Resource 50) could only be displayed within a Yellow Pages application when the user is browsing through attorney listings. The format and interpretation of the Resource Rules 60 can take many forms (e.g., IF-THEN rules, scripts, etc.) that would be known to one skilled in the art.

Figure 2:
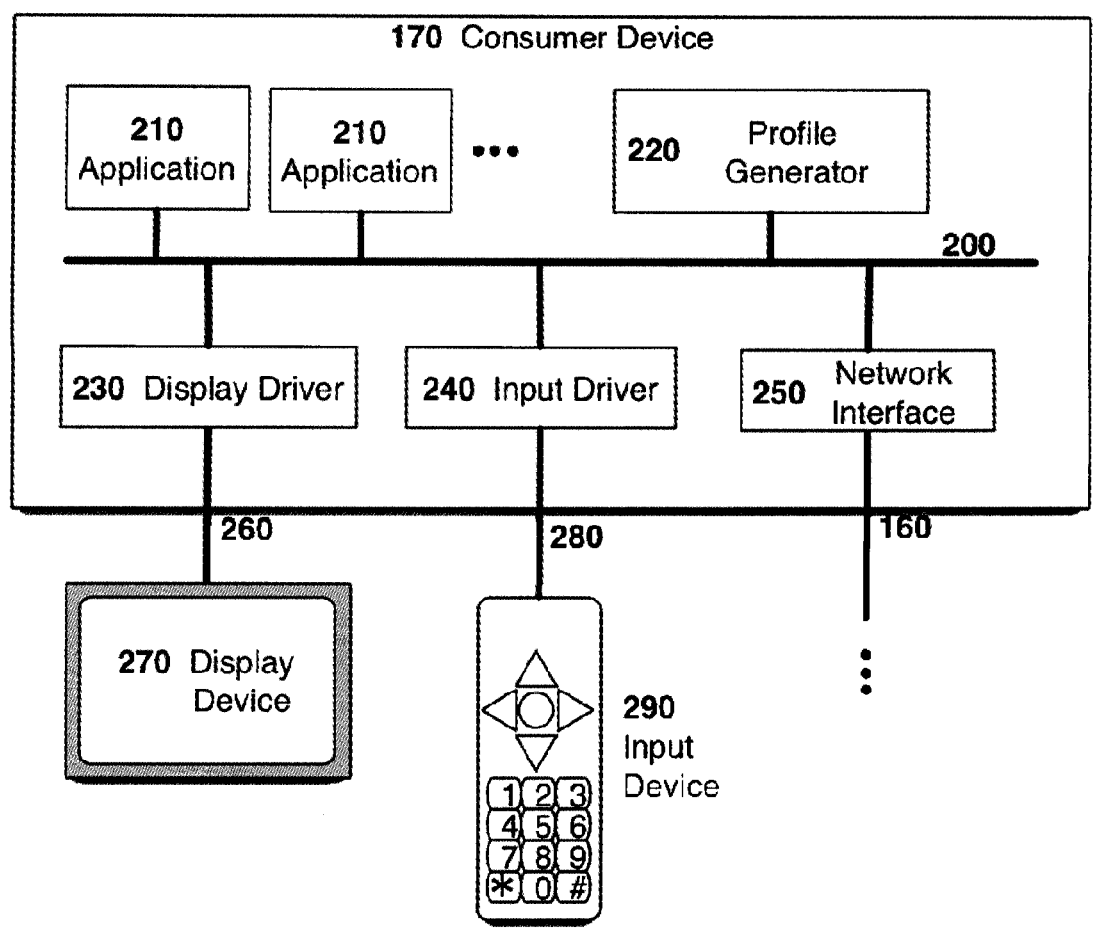
FIG. 2 is a diagram depicting components of a Consumer Device in accordance with an embodiment of the invention.
Figure 6:
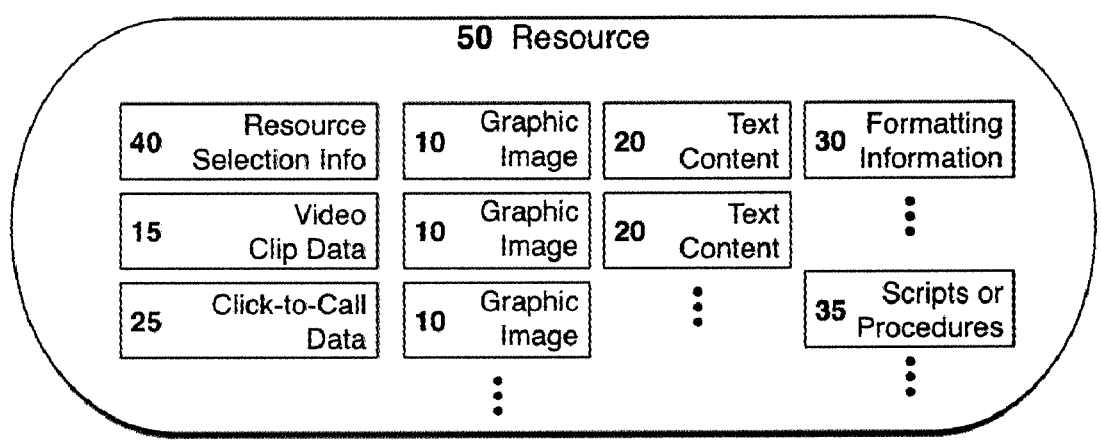
FIG. 6 is a diagram depicting components of a Resource in accordance with an embodiment of the invention.
Figure 7:
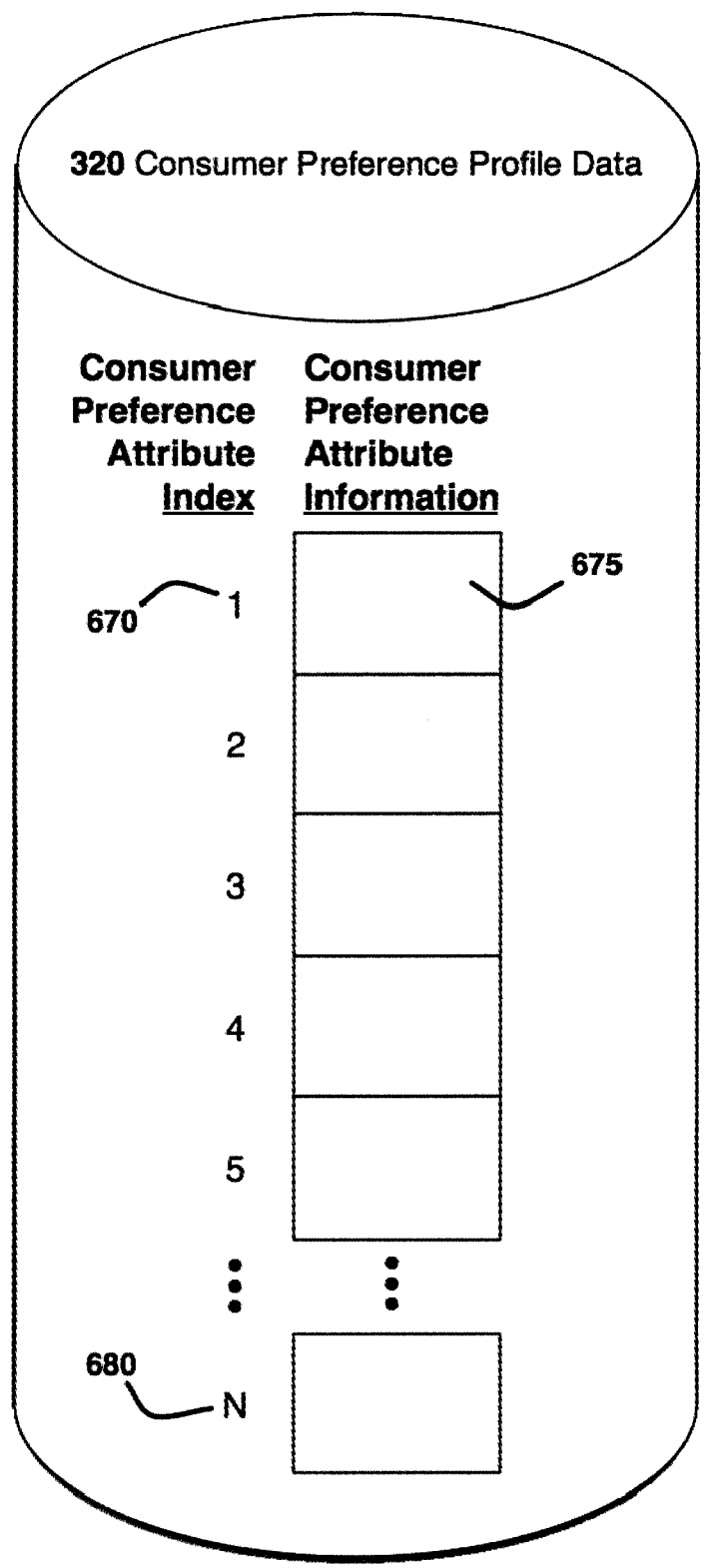
FIG. 7 is a diagram depicting contents of Profile Data in accordance with an embodiment of the invention.

A Resource 50, depicted in FIG. 6, may consist of a collection of data of interest to a consumer and may be utilized on a Consumer Device 170 (FIG. 1) by an Application 210 (FIG. 2, described below). Data elements contained within a Resource 50 may include: Resource Selection Info 40, zero or more Video Clip Data 15, zero or more Click-to-Call Data 25, zero or more Graphic Images 10, zero or more Text Contents 20, zero or more Formatting Information 30, and zero or more Scripts or Procedures 35. A Resource 50 may embody all the elements necessary to display and execute an interactive or non-interactive advertisement by an interactive television Application 210. Resource Selection Info 40 may be any collection of binary and/or textual data that can be used to associate the enclosing resource with one or more consumers. This information may be derived from, for example, Consumer Preference Profile Data 320 (FIG. 7). Video Clip Data 15 may consist of binary or textual data that may either be rendered by a computer into a video clip or may identify one or more video clip retrieval locations. Video files may exist in a variety of formats such as, for example, MPEG-1, MPEG-2, MPEG-4, AVI, RealMedia, Windows Media, and Quicktime. Click-to-Call Data 25 may be any text or binary data that may be used to automate a telephone call between the consumer and a second party. The second party may be pre-defined. Graphic Images 10 may be binary data that may be rendered by a computer into, for example, a photo, a picture, or a drawing. Graphic image files may exist in a variety of formats such as, for example, JPEG, GIF, PNG, and BMP. Text Content 20 may be any text data file or string that may contain arbitrary textual information such as, for example, advertising copy, product recommendations, news content, Internet URLs, phone numbers, or application specific data. Formatting Information 30 may be any arbitrary text or binary data that may be used to describe the presentation of the resource contents on a display device. Scripts or Procedures 35 may be any computer executable code in binary or textual form that may perform some function with the resource data, such as, for example, causing text data to scroll across the bottom of a display device.

Returning now to FIG. 1, Resource Servers 120 may consist of a Network Server 140 and a Resource Selector 130 connected via a Computer Network 110. Resource Servers 120 may work together to receive resource requests from Consumer Devices 170, find the most appropriate Resource 50 (FIGS. 5 and 6) to satisfy the request from a Resource Database 90, and return the Resource 50 to the requesting Consumer Device 170. Multiple Resource Servers 120 may be used for load balancing. A Resource Server 120 may be embodied by a single physical computer containing one or more applications that provide the functionality of the Network Server 140 and Resource Selector 130, or a Resource Server 120 may be a logical collection of other computing devices that embody the Network Server 140 and Resource Selector 130.

The Network Server 140 may be a software program or physical computing device that receives incoming IP data via a Computer Network 110 according to a pre-defined protocol or protocols (e.g., UDP, TCP, HTTP, POP-3, FTP, NNTP, etc.). The data may define a request for a Resource 50 available to the Network Server 140 (see, for example, exemplary HTTP Resource Request 750 depicted in FIG. 8). The Network Server 140 may retrieve the Resource 50 directly, or may retrieve the Resource 50 by executing a software program or script (e.g., by executing a script that may pass the request on to a Resource Selector 130 that may retrieve a Resource 50 from a Resource Database 90). The retrieved Resource 50 may then be sent back to the originator of the request according to the protocol being used. The Network Server 140 may be, for example, an Apache web server, implementing the HTTP protocol over the TCP/IP protocol, and executing PHP scripts in response to requests; the PHP scripts may retrieve a Resource 50 from a Resource Selector 130 and relay the Resource 50 back to the Apache web server, which may then send the Resource 50 back to the originator of the HTTP request in the payload of the HTTP response.

The Resource Selector 130 may be a software program or physical computing device that may receive resource requests from Consumer Devices 170 via a Computer Network 110 that may have been relayed from a Network Server 140. The Resource Selector 130 may use targeting, context, and other information contained in the request to select an appropriate Resource 50 from a Resource Database 90 based on Resource Rules 60, Resource Group Information 70, and Resource Selection Info 40 contained therein. The actual format and contents of the Resources 50, targeting and context information, and methods used to evaluate the appropriateness of the resource may be specific to each embodiment.

The Resource Manager 100 may be one or more computer programs or procedures for inserting, modifying, deleting, reporting on, tracking, and analyzing Resources 50 and Resource Groups 80 in one or more Resource Databases 90. The Resource Manager 100 may embody an advertising campaign manager used to manage advertising campaigns. Reporting functionality in such an embodiment may include, for example, reporting the number of times a given advertisement is served and/or clicked on by users over a specified timeframe.

Referring now to FIG. 2, there is provided a diagram depicting key components of a Consumer Device 170 according to one embodiment of the invention. Applications 210 may represent applications suitable for running on devices such as digital televisions, set-top boxes, mobile phones, PDAs, and personal computers. Such applications may range from highly interactive to mostly passive. Examples of interactive Applications 210 may include, for example, applications for providing interactive weather forecasts, managing Fantasy Sports teams, participating in on-line auctions, accessing yellow pages, participating in votes or polls, searching the Internet, or engaging in email or chat. Examples of passive Applications 210 may include, for example, viewing TV programs, movies, videos, reading news, or listening to music. Any such application may benefit from integrating personalized resources as enabled by the present disclosure. Data used in running such applications may be retrieved from other devices (for example, servers at cable or satellite TV headends, Internet servers, peer-to-peer devices, or Resource Servers 120) over Broadband Network 160 via a Network Interface 250. A Display Driver 230 may be used to control one or more Display Devices 270 such as, for example, televisions, mobile phone displays, and computer monitors via a wired or wireless connection 260. An Input Driver 240 may be used to acquire data from one or more Input Devices 290 utilized by the device user, connected via a wired or wireless link 280. Input Devices 290 may include, but are not limited to, television remote controls, computer keyboards, cameras, and microphones. A Profile Generator 220 may be responsible for building, managing, and summarizing consumer preference profiles. The internal components of the Consumer Device 170 may be connected via a device bus 200.

Figure 3:
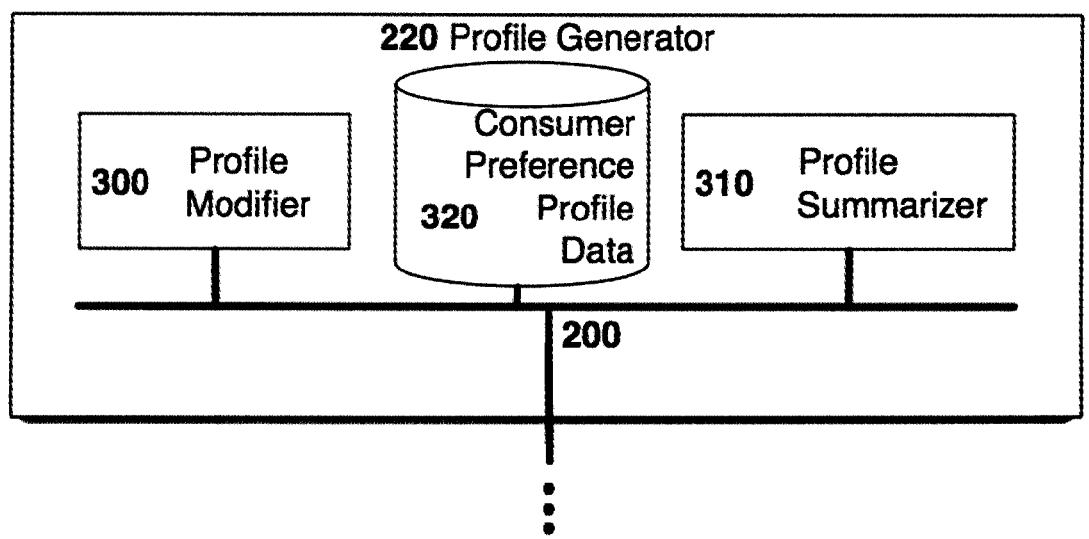
FIG. 3 is a diagram depicting components of a Profile Generator in accordance with an embodiment of the invention.
Figure 11:
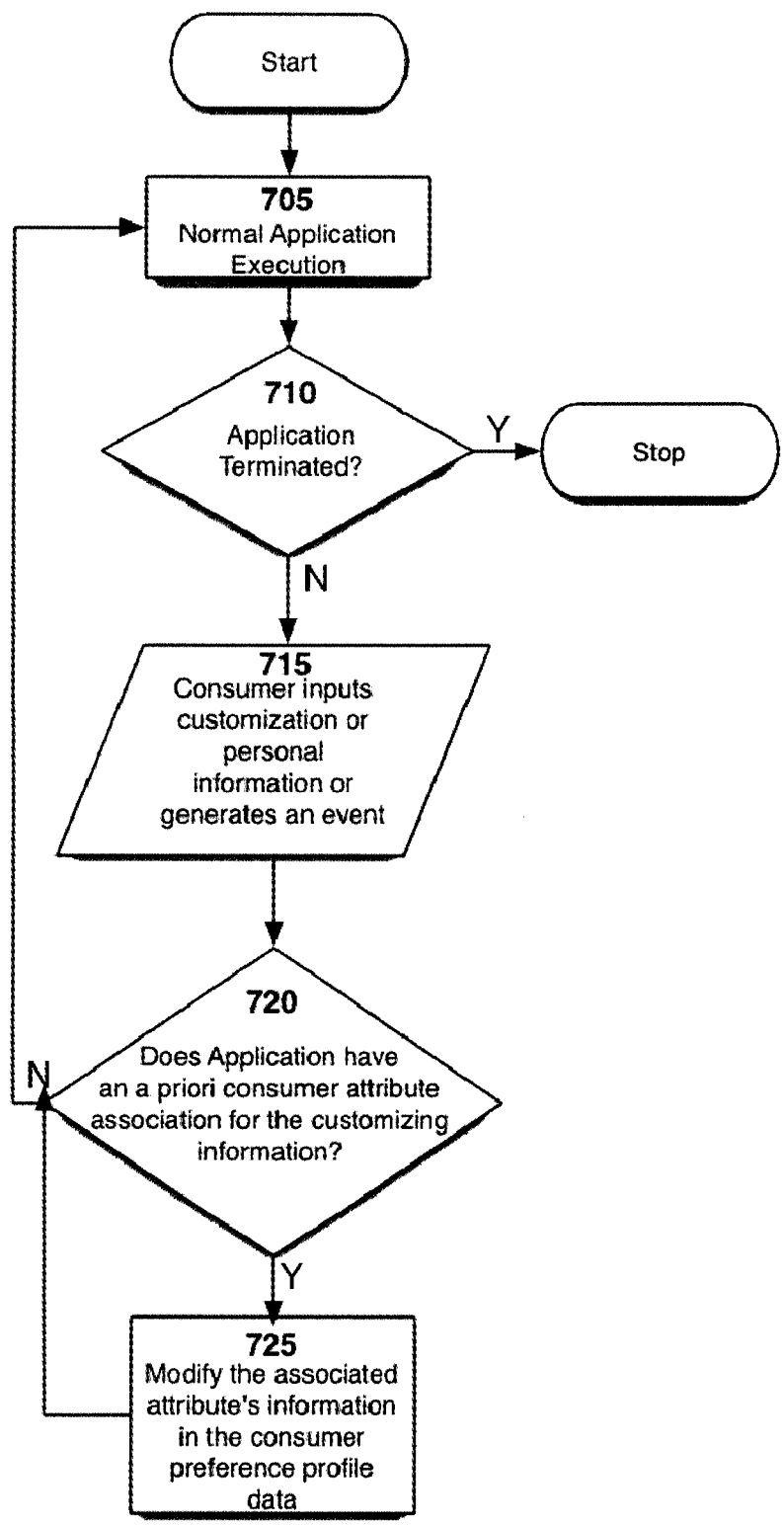
FIG. 11 is a flowchart depicting steps for updating Profile Data in accordance with an embodiment of the invention.

As depicted in FIG. 3, a Profile Generator 220 may consist of a Profile Modifier 300, Consumer Preference Profile Data 320, and a Profile Summarizer 310 connected over the device bus 200. The Profile Modifier 300 may be responsible for building one or more consumer preference profiles based on consumer attributes that may be associated with applications and content used or consumed by the device user(s). An exemplary process appropriate for execution by the Profile Modifier 300 is depicted in FIG. 11. Consumer preference attributes may be associated with application events such as, for example: the running of each Application 210; the consumption of particular content items like TV programs, video items, news stories, and music tracks; and the usage of user input fields provided in interactive applications. The consumer preference attributes may be aggregated over time in one or more Consumer Preference Profile Data 320 data structures to build profiles of the consumers who use the device. The data structures may be compact and logically consistent. Appropriate aggregation algorithms may maintain the level of evidence (a.k.a. "belief proportionality") between each attribute appropriately for the profiled consumer. An exemplary Consumer Preference Profile Data 320 data structure is depicted in FIG. 7. The data structure may consist of some number N of Consumer Preference Attributes, where each attribute may correspond to a Consumer Preference Attribute Index from 1 (670) to N (680) and each index may be associated with Consumer Preference Attribute Information 675. Consumer Attributes contained in the Consumer Preference Profile Data 320 may correspond to those attributes most often associated with applications and content consumed on the Consumer Device 170. The N attributes most relevant to the device users(s) may be maintained in the structure. The oldest attributes that are least relevant may be discarded to make room for newer attributes that may become more relevant over time. Consumer Preference Attribute Information 675 may be a weight value associated with each attribute normalized over all relevant attributes. The final component of the Consumer Preference Profile Generator 220 may be a Profile Summarizer 310. The function of the Profile Summarizer 310 may be to access the Consumer Preference Profile Data 320 appropriate for the device user at the time a personalized Resource 50 is needed by an Application 210, and provide a consumer profile summary to that Application 210. The summary may be a compact representation of the Consumer Preference Profile Data 320 appropriate for the application user at request time. As illustrated in the PROFILE-SUMMARY field of the HTTP Resource Request 750 depicted in FIG. 8, a profile summary may be a string of hexadecimal digits.

Attributes associated with applications and content and used to construct consumer preference profiles may reflect characteristics related to demographics, geography, psychology, and/or interests and behaviors of users. In this embodiment, representative attributes in each category may be as illustrated in the following table.

| Category | Attributes |
| --- | --- |
| Demographics | |
| Age | Children (2-5), Children (6-11), Teens Male (12-17), Teens Female (12-17), Men (18-20), Men (21-24), Men (25-34), Men (35-49), Men (50-54), Men (55-64), Men (65+), Women (18-20), Women (21-24), Women (25-34), Women (35-49), Women (50-54), Women (55-64), Women (65+) |
| Employment | Part-Time, Full-Time |
| Income | $0-24999, $25000-49999, $50000-74999, $75000-99999, $100000-149999, $150000+ |
| Ethnicity | White, African American, Hispanic, Asian |
| Education | High-school, College, Graduate-school |
| Family | Single, Couple, With Kids |
| Geography | |
| US Region | Northeast, Mid-Atlantic, Southeast, Midwest, Southwest, Westcoast, North, Northwest |
| Population Density | Rural, Urban |
| Psychology | |
| VALS ™ Type* | Innovator, Thinker, Achiever, Experiencer, Believer, Striver, Maker, Survivor<br>*A framework defined by SRI Consulting Business Intelligence |
| Interests/Behaviors | |
| Religious | No, Yes |
| Politics | Red, Blue |

-continued

| Category | Attributes |
| --- | --- |
| Genres | Action-Adventure, Animation, Arts, Biography, Comedy, Crime, Documentary, Drama, Education, Family, Film-Noir, etc. |
| Product Interests | Antiques, Art, Automotive, Baby, Books, Business & Industrial, Cameras & Photo, Cell Phones & PDAs, Clothing Shoes & Accessories, Coins & Paper Money, Collectibles, etc. |
| Provider Interests | Agriculture Forestry Fishing & Hunting, Mining, Utilities, Construction, Manufacturing, Wholesale Trade, Retail Trade, Transportation & Warehousing, Information, Finance & Insurance, etc |

Figure 9:
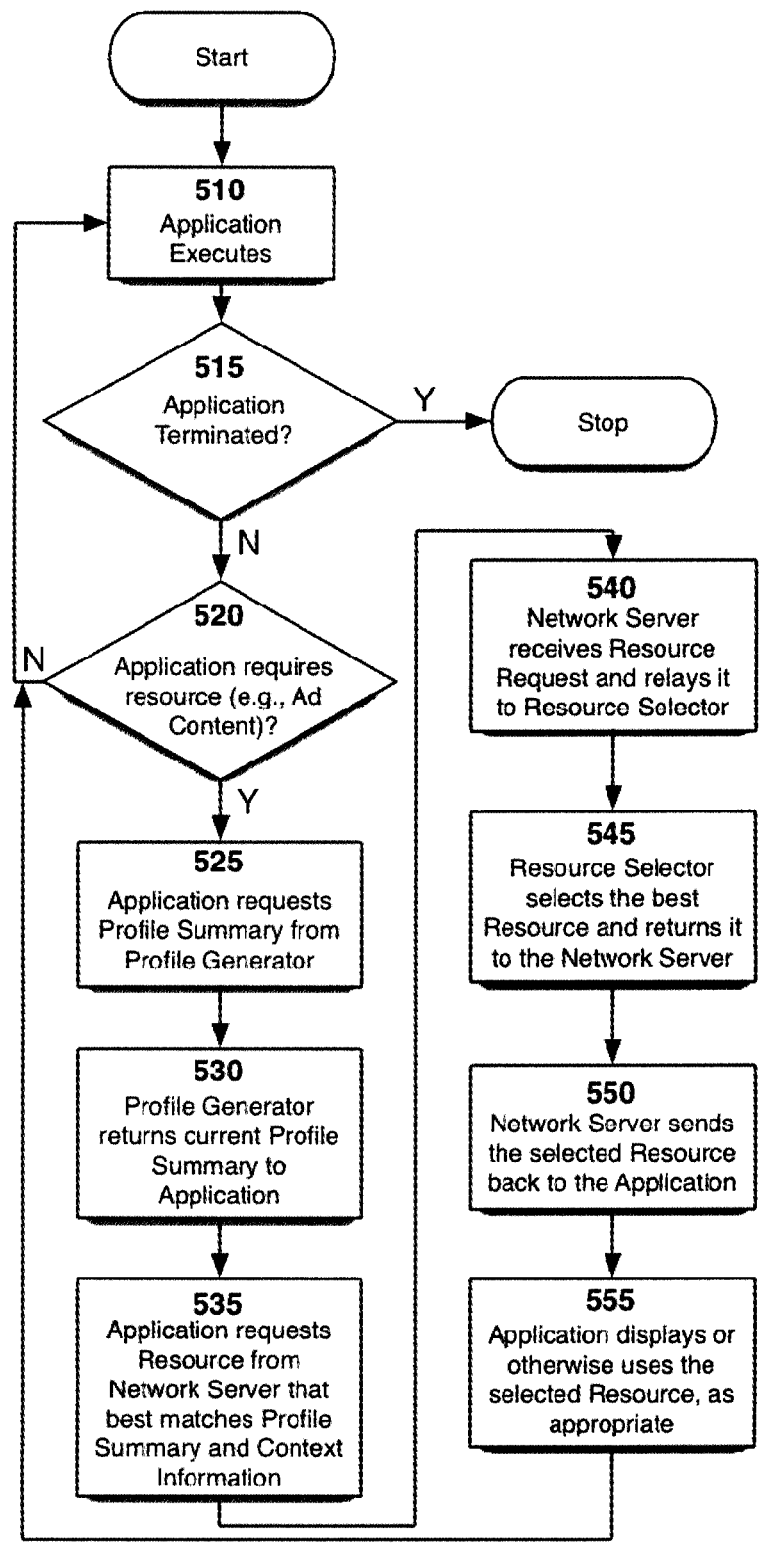
FIG. 9 is a flowchart depicting steps to provide a personalized Resource to a requesting Application in accordance with an embodiment of the invention.

Referring now to FIG. 9, there is depicted a flowchart depicting steps to provide a personalized Resource to a requesting Application in accordance with an embodiment of the invention. The process may begin at step 510 with the execution of an Application 210. In step 515, a test is made to determine if the application has terminated. If yes, the process may end. Otherwise, step 520 may test whether or not the Application 210 may use a personalized Resource 50. If this test returns no, application execution may continue with step 510. If the test returns yes, step 525 may be executed, so that the Application 210 may request a profile summary from the Profile Generator 220. In step 530, the Profile Generator 220 may generate and return an appropriate current consumer profile summary to the Application 210. The summary may reflect the latest profile of the current user if the user is known through log-in or other information, a device-wide profile induced from the activities of all users of the device, or a profile otherwise induced (by timeslot, application context, or other means) to reflect the current user. In step 535, the Application 210 may request a Resource 50 from a Network Server 140 that may match the profile summary and context information as closely as possible. In addition to sending profile and context information to the Network Server 140, the Application 210 may also send other information, such as, for example, information specifying the format and type of the desired Resource 50. In an ad targeting embodiment, for example, the information may specify the size, resolution, and/or type (e.g., banner, text, video) of the desired advertisement.

Context information may be a summary of what Applications 210 are running at a given time (or most recently), and what information is currently (or most recently) being accessed on the device. There are many different types of context information that might be compiled, and the specific types of context information one chooses may vary and is not limited by the examples provided. The relevant profile summary and context information may be presented to the Network Server 140 in a resource request as depicted in FIG. 8, or encoded in other manners.

FIG. 8 is a diagram depicting exemplary contents of an HTTP Resource Request in accordance with an embodiment of the invention. The HTTP Resource Request may consist of multiple return-delimited text strings. Key context fields may be denoted as DATE-TIME, LOCATION-ZIPCODE, CONTEXT-APPLICATION, CONTEXT-APP-INTERNAL, and CONTEXT-CHANNEL. The PROFILE-SUMMARY field may be a rank-ordered hex encoding of the most significant attributes (attribute IDs) that may apply to the current user.

In an embodiment where context information may use the same attributes used in Profile Data 320, a Resource Request 750 may combine the profile summary and context information into a more-compact string. A technique to provide such a string is to rank all attributes relevant to the current user together with attributes relevant to the device context and transmit the M most important (i.e., most highly ranked) attributes, where M is a number determined by current bandwidth availability and/or other processing considerations. For example, if the user is currently using an on-line auction application and has most recently expressed interest in golf clubs and Brand X golf balls, a context summary might consist of top-ranked attributes: AUCTION, GOLFCLUBS, BRANDXGOLFBALLS. If the profile summary for the user is represented by the ordered attributes: MEN (25-34), TRAVELER, NY, NYC, GENRE COMEDY, GOLFER, etc., a combined profile-summary and context-summary might consist of the ordered attributes: AUCTION, GOLFCLUBS, BRANDXGOLFBALLS, MEN (25-34), TRAVELER, GOLFER, NY. An algorithm may be used to combine the user profile and device context which may cause the GOLFER attribute to appear ahead of attributes NY, NYC, and GENRE COMEDY. Also, for purposes of this example, an arbitrary M=7 is used, so only the top 7 attributes are included in the Resource Request 750. Of course, other values of M may be utilized. Similar to the PROFILE-SUMMARY string depicted in FIG. 8, transmitted attributes may be hexadecimal encodings of attribute IDs. Various other attribute combination methods are possible as may be contemplated by those skilled in the art.

Continuing now with FIG. 9, in step 540 the Network Server 140 may receive the resource request and relay it to the Resource Selector 130. In step 545, the Resource Selector 130 may select the best Resource 50 and return it to the Network Server 140. Sub-steps that provide more detail to step 545 are provided in FIG. 10 discussed below. In step 550, Network Server 140 may send the selected Resource 50 back to the requesting Application 210. Finally in step 555, the Application 210 may display or otherwise use the selected Resource 50. Application execution may continue with step 510.

FIG. 12 is a diagram depicting content on a Display Device 270 associated with a Consumer Device 170 (FIG. 2) running an Application 210 providing video and text related to a speed skating event 410 in accordance with an embodiment of the invention. This exemplary Application 210 may support targeted advertising and may require a personalized advertisement resource for the current device user to display in the empty Ad Inventory slot 400. Consistent with the method depicted in FIG. 9, steps may be executed wherein the required Resource 50 may be a personalized Advertisement 420 which may be requested, delivered, and displayed by the Application 210 in Ad Inventory slot 400. The size and shape of slot 400 may represent format characteristics for the required targeted ad. In the example, the advertisement is most likely a static banner advertisement of a particular size. In other Applications 210, animations, videos, or other ad Resources 50, for example, may be requested and integrated.

Figure 10:
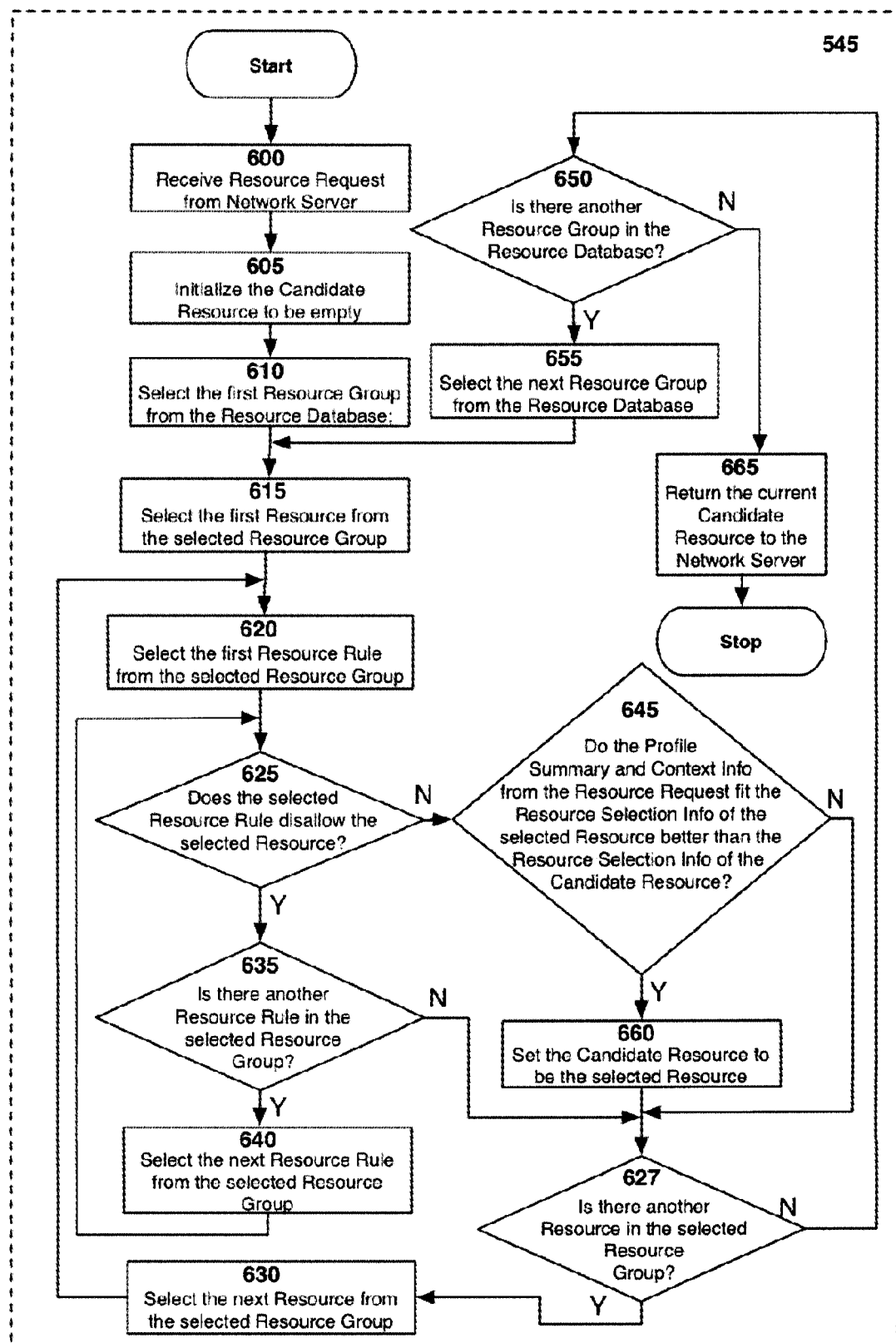
FIG. 10 is a flowchart illustrating sub-steps of a step depicted in FIG. 9 wherein a Resource Selector selects a Resource and returns it to the Network Server in accordance with an embodiment of the invention.

FIG. 10 is a flowchart illustrating sub-steps of the step 545 depicted in FIG. 9 wherein a Resource Selector selects a Resource 50 and returns it to the Network Server 140 in accordance with an embodiment of the invention. Implementation details may be adjusted to achieve acceptable processing efficiency as known to those skilled in the art. In step 600, a Resource Selector 130 may receive a Resource Request from a Network Server 140. In step 605, the Resource Selector 130 may initialize the Candidate Resource to be empty. In step 610, the Resource Selector 130 may select the first Resource Group 80 from the Resource Database 90. In step 615, the Resource Selector 130 may select the first Resource 50 from the selected Resource Group 80. In step 620, the Resource Selector 130 may select the first Resource Rule 60 from the selected Resource Group 80. In step 625, there is a test to determine if the selected Resource Rule 60 disallows the selected Resource 50. If the selected Resource Rule 60 disallows the selected Resource 50, step 635 may be executed wherein a test is made to determine if there is another Resource Rule 60 in the selected Resource Group 80. If there is another Resource Rule 60 in the selected Resource Group 80, this test may return yes, and execution may continue with step 640. In step 640, the Resource Selector 130 may select the next Resource Rule 60 from the selected Resource Group 80 and processing may continue with step 625. If the test in step 625 returns no, step 645 may be executed. In step 645, there is a test to determine whether the Profile Summary and Context Info from the Resource Request fit the Resource Selection Info 40 of the selected Resource 50 better than the Resource Selection Info 40 of the Candidate Resource. If the Profile Summary and Context Info from the Resource Request fit the Resource Selection Info 40 of the selected Resource 50 better than the Resource Selection Info 40 of the Candidate Resource, this test may return yes, and step 660 may be executed. In step 660, the Candidate Resource may be set to be the currently selected Resource 50 and execution may continue with step 627. In step 627, a test may determine whether there is another Resource 50 in the selected Resource Group 80. If there is another Resource 50 in the selected Resource Group 80, step 630 is executed. In step 630, the Resource Selector 130 may select the next Resource 50 from the selected Resource Group 80, and processing may continue with step 620. If there is not another Resource 50 in the selected Resource Group 80, and step 627 returns no, step 650 may be executed. In step 650, a test may determine whether there is another Resource Group 80 in the Resource Database 90. If there is not another Resource Group 80 in the Resource Database 90, step 665 is executed. In step 665, the Resource Selector 130 may returns the current Candidate Resource to the Network Server 140, and the process may end. If there is another Resource Group 80 in the Resource Database 90, and the test in step 650 returns yes, step 655 may be executed. In step 655, the Resource Selector 130 may select the next Resource Group 80 from the Resource Database 90 and execution may continue with step 615. Returning to the test in step 645 (above), if the Profile Summary and Context Info from the Resource Request do not fit the Resource Selection Info 40 of the selected Resource 50 better than the Resource Selection Info 40 of the Candidate Resource, the test may return no, and processing may continue with the test in step 627 (above). Returning to the test in step 635, if there is not another Resource Rule 60 in the selected Resource Group 80, the test may return no, and processing may continue with the test in step 627 (above).

FIG. 11 is a flowchart depicting steps for building a consumer preferences profile in accordance with an embodiment of the invention. The building operation may be done by the Profile Modifier 300 (FIG. 3) operating on Consumer Preference Profile Data 320. The process may begin in step 705 with the execution of an Application 210. In step 710, a test may determine if the Application 210 has terminated. If the Application 210 has terminated, the process may stop. If the Application 210 has not terminated, step 715 may be executed where an application event may be detected indicating that a consumer has input customization or personal information using the Input Device 290, or that an other event has occurred. Examples of the input events may include explicit entry by the user of ratings information, survey responses, home zip code, favorite sports team, or other information requested by the application. Examples of other events may include the user utilizing a particular feature of an iTV application, navigating to a particular page, changing channels, or viewing a particular TV program or video in a content-viewing application. In step 720, a test may determine whether the Application 210 has a consumer attribute association for the customizing information. If the Application 210 has a consumer attribute association for the customizing information, step 725 may be executed where the Profile Modifier 300 may modify the associated attribute's information in the Profile Data 320 and normal execution may resume with step 705. If the Application 210 does not have a consumer attribute association for the customizing information test in step 720, execution may continue with step 705.

In addition to the targeted advertising embodiment highlighted in the preceding text, other embodiments are envisioned wherein the provision of personalized resources to users of consumer devices is beneficial. Two further such exemplary embodiments are capable of: providing recommendations for TV programs, movies, music, text, products, or services to users of consumer devices; and providing technical support tailored to a user's technical capacity, preferences, and past history of device usage.

What is claimed is:

1. A method for providing personalized data resources to applications executing on consumer devices, the method comprising:
    building a consumer preferences profile on a consumer device in a logically-consistent manner using predefined associations between consumer preference attributes and application events, the consumer preferences profile comprising a structure that maintains evidence of each attribute based on application event activity on the device using predefined associations between consumer preference attributes and application events wherein the evidence comprises evidence of attributes associated with each application that is run and content that is consumed;
    summarizing the consumer preferences profile into a profile summary, the profile summary describing the current user of the application executing on the consumer device, when the application requires a new personalized data resource;
    requesting, from a plurality of data resources over a broadband network, a personalized data resource matching application context information and the profile summary in the request, wherein the plurality of data resources comprises a plurality of data resource groups, and wherein the application context information comprises most recent consumer application data, including data representing a plurality of applications most recently run on the consumer device and data representing at least one application currently running on the consumer device and content data including data representing content most recently consumed using the consumer device and data representing at least one content currently used on the consumer device;
    identifying a candidate set of data resources according to resource rules in the resource groups;
    automatically selecting a personalized data resource from the candidate set of data resources that matches the profile summary and the context information; and
    delivering the selected personalized data resource to the requesting application executing on the consumer device over a broadband network.

2. The method of claim 1, wherein the personalized data resources are selected from the group consisting of resource selection information, graphic images, text content, formatting information, video clip data, click-to-call data, and scripts and procedures.

3. The method of claim 1, wherein the consumer device comprises a digital television.

4. The method of claim 1, wherein the consumer device comprises a digital television set-top box.

5. The method of claim 1, wherein the consumer device comprises a personal digital assistant.

6. The method of claim 1, wherein the consumer devices comprises a mobile telephone.

7. The method of claim 1, wherein the broadband network comprises a digital cable television network.

8. The method of claim 1, wherein the broadband network comprises a digital satellite television broadcast network.

9. The method of claim 1, wherein the broadband network comprises a mobile phone network.

10. The method of claim 1, wherein the data resources comprise advertisements, the resource rules comprise advertising business rules, and the resource groups contain advertisements and business rules associated with an advertising campaign.

11. The method of claim 1, wherein the data resources define recommendations for products or services.

12. The method of claim 1, wherein the applications executing on the consumer devices include applications for accessing news and other information, receiving weather forecasts, playing fantasy sports, participating in on-line auctions, accessing yellow pages information, summarizing sporting event results, participating in votes or polls, searching the Internet, engaging in email or chat, or presenting television programs, movies, other video content, or playing music tracks.

13. The method of claim 1, wherein the consumer preference attributes comprise one or more of the categories of demographics, geography, psychology, behaviors, and interests of consumers using the applications executing on the consumer devices.

14. The method of claim 13, wherein the behaviors and interests comprise specific products and services identified by consumers using the applications executing on the consumer devices.

15. The method of claim 1, wherein the most recent consumer application and content data is ranked or weighted.

16. A system for providing personalized data resources over a broadband network to applications executing on consumer devices, the system comprising:
    one or more consumer devices, each comprising a computing device, display device, input device, applications, a context log comprising application context information including most recent data, including data representing a plurality of applications most recently run on the consumer device and data representing at least one application currently running on the consumer device and content data including data representing content most recently consumed using the consumer device and data representing at least one content currently used on the consumer device, and a profile generator comprised of consumer preference profile data, wherein the consumer preferences profile data comprises evidence of each attribute arranged in a logically consistent manner, a profile modifier configured to modify the profile data based on application events and content associated with predefined consumer preference attributes by integrating evidence of attributes associated with each application that is run and content that is consumed, and a profile summarizer configured to generate a compacted profile summary describing the current user of the application executing on the consumer device;

a broadband network connecting the consumer devices to a broadband gateway;

one or more resource servers, each comprising a network server and a resource selector; and a centralized resource database containing a plurality of resource groups, wherein each resource group includes a plurality of resource rules, a plurality of data resources, and resource group information, further wherein data resources include a plurality of optional selection info, graphic images, text content, formatting information, video clip data, click-to-call data, and scripts and procedures.

17. The system of claim 16, additionally comprising a resource manager for inserting, modifying, deleting, reporting on, tracking, and analyzing content of the resource database.

18. The system of claim 16, wherein the data resources define recommendations for products or services.

19. The system of claim 16, wherein the consumer device comprises a digital television.

20. The system of claim 16, wherein the consumer device comprises a digital television set-top box.

21. The system of claim 16, wherein the consumer device comprises a personal digital assistant.

22. The system of claim 16, wherein the consumer devices comprises a mobile telephone.

23. The system of claim 16, wherein the broadband network comprises a digital cable television network.

24. The system of claim 16, wherein the broadband network comprises a digital satellite television broadcast network.

25. The system of claim 16, wherein the broadband network comprises a mobile phone network.

26. The system of claim 16, wherein in the resource database, the data resources comprise advertisements, the resource rules comprise advertising business rules, and the resource groups contain advertisements and business rules associated with an advertising campaign.

27. The system of claim 16, wherein the data resources comprise recommendations for products or services.

28. The system of claim 16, wherein the applications executing on the consumer devices include interactive applications for accessing news and other information, receiving weather forecasts, playing fantasy sports, participating in on-line auctions, accessing yellow pages information, summarizing sporting event results, participating in votes or polls, searching the Internet, engaging in email or chat, or presenting television programs, movies, other video content, or playing music tracks.

29. The system of claim 16, wherein the consumer preference attributes comprises one or more of the categories of demographics, geography, psychology, behaviors, and interests of consumers using the applications executing on the consumer devices.

30. The system of claim 29, wherein the behaviors and interests comprise specific products and services identified by consumers using the applications executing on the consumer devices.

31. The system of claim 16, wherein the consumer preference profile comprises a structure that maintains the level of evidence of each attribute in a logically consistent manner by appropriately integrating the evidence of attributes associated with each application that is run and content consumed.

32. The system of claim 16, wherein the most recent consumer application and content data is ranked or weighted.

33. A system for providing personalized data resources to applications executing on consumer devices, comprising:

one or more computer processors that build a consumer preferences profile on a consumer device in a logically-consistent manner using predefined associations between consumer preference attributes and application events, the consumer preferences profile comprising a structure that maintains evidence of each attribute based on application event activity on the device using predefined associations between consumer preference attributes and application events, wherein the evidence comprises evidence of attributes associated with each application that is run and content that is consumed;

one or more computer processors that summarizes the consumer preferences profile into a profile summary, the profile summary describing the current user of the application executing on the consumer device, when the application requires a new personalized data resource;

one or more computer processors that selects from a plurality of data resources over a broadband network, a personalized data resource including matching application context information and the profile summary in the request, wherein the plurality of data resources comprises a plurality of data resource groups, and wherein the application context information comprises most recent consumer application data, including data representing a plurality of applications most recently run on the consumer device and data representing at least one application currently running on the consumer device and content data including data representing content most recently consumed using the consumer device and data representing at least one content currently used on the consumer device;

one or more computer processors that identify a candidate set of data resources according to resource rules in the resource groups;

one or more computer processors that automatically selects a personalized data resource from the candidate set of data resources that matches the profile summary and the context information; and one or more computer processors that deliver the selected personalized data resource to the requesting application executing on the consumer device over a broadband network.

34. A system for providing personalized data resources over a broadband network to applications executing on consumer devices, the system comprising:

a server configured to function with one or more consumer devices, each consumer device comprising a computing device, display device, input device, applications, a context log comprising application context information including most recent consumer device data, including data representing a plurality of applications most recently run on the consumer device and content most recently consumed using the consumer device, and a profile generator comprised of consumer preference profile data, wherein the consumer preferences profile data comprises evidence of each attribute arranged in a logically consistent manner, a profile modifier configured to modify the profile data based on application events and content associated with predefined consumer preference attributes by integrating evidence of attributes associated with each application that is run and content that is consumed from the context log, and a profile summarizer configured to generate a compacted profile summary describing the current user of the application executing on the consumer device, wherein the compacted profile summary is based on the modified profile data and wherein the profile summarizer ranks all consumer preference attributes and attributes associated with the context log to produce a predefined number of most important attributes specific to the current user;

a broadband network connecting the consumer devices to a broadband gateway;

one or more resource servers, each comprising a network server and a resource selector; and a centralized resource database containing a plurality of resource groups, wherein each resource group includes a plurality of resource rules, a plurality of data resources, and resource group information, further wherein data resources include a plurality of optional selection info, graphic images, text content, formatting information, video clip data, click-to-call data, and scripts and procedures.

35. The method of claim 1 wherein summarizing the consumer preference profile into a profile summary includes ranking the consumer preference attributes and application events to determine a predetermined number of most important attributes and events.

36. The method of claim 35, wherein the predetermined number of most important attributes and events is based on at least one of: a current bandwidth availability and a processing consideration.

* * * * *